Patented July 13, 1937

2,086,712

UNITED STATES PATENT OFFICE 2,086,712

COATING ZINC AND THE COATED ARTICLE

Matthew Green, Detroit, Mich., assignor to Parker Rust-Proof Company, Detroit, Mich., a corporation of Michigan No Drawing. Application January 21, 1932, Serial No. 587,967

11 Claims. (Cl. 148—6)

This invention relates to coating zinc and to articles produced thereby and more particularly to the acceleration of the formation on zinc of a coating of an approximately insoluble salt of zinc and other materials.

Among the purposes of the invention are to provide a new mixture from which a coating solution may be prepared, a method of forming the solution and a method of coating zinc therewith and the production of an improved coated article thereby.

It has long been known that a hot dilute solution of phosphoric acid acts on iron and, after sufficient iron has been dissolved to "balance" the solution, a coating of comparatively insoluble phosphate is formed on the iron. This coating is rust resistant and also makes an excellent foundation for paint or lacquer.

Similarly, a hot dilute solution of phosphoric acid will dissolve zinc until it becomes "balanced", and thereafter will form on zinc a phosphate coating. If the solution is previously "balanced", the coating operation takes less time than when the start is made with the acid solution, but it still requires an objectionably long time. The speed of operation varies with the condition of the zinc surface, but one half hour is a fairly short time within which to secure a coating on zinc in a balanced zinc phosphate bath.

I have discovered that the addition of iron to the bath greatly accelerates its action, and also improves the quality of the resulting coating on the zinc, making it much more adherent. The amount of iron in the bath may be varied widely. The iron goes into the coating rapidly and suitable replenishment must be provided. The improvement in coating zinc with phosphate coatings accelerated by iron is made the subject of a divisional application, Serial No. 43,198 filed October 2, 1935, and accordingly is not described in detail in this specification or claimed herein.

Zinc can be coated with zinc salts of certain organic acids in a similar manner. These acids comprise the dicarboxylic and hydroxy-dicarboxylic acids in the aliphatic series and carboxylic acids having but one carboxyl group and sulphonic acids in the aromatic series. In each case, the addition of a soluble compound of iron accelerates the action and improves the resulting coating.

One example of a very good solution for coating zinc is an aqueous solution of oxalic acid, sodium nitrate and sulphate of iron. It is preferable to use this solution as a spray. It may be mixed with inert material, sprayed onto a zinc surface, and dried thereon and then removed, or it may be merely sprayed on as a liquid and the remnant washed off.

One specific mixture, with the inert material, which has been found satisfactory is:

| | | |
|---|---|---|
| Water | gallon | 1 |
| Oxalic acid | grams | 360 |
| Sodium nitrate | do | 120 |
| Ferrous sulphate | do | 60 |
| Fuller's earth | pounds | 4 |

The oxalic acid, sodium nitrate and ferrous sulphate may be mixed in about the proportion specified and in the granular form, and dissolved in water to form the solution when desired. The granular material may be shipped without paying freight on water, and still correct proportions insured.

A satisfactory liquid spray may be made by dissolving the same amounts of chemicals in 1½ gallons water and omitting the fuller's earth. Such a solution coats a zinc surface even when at usual atmospheric temperature, and the action is very rapid at a slightly elevated temperature.

Other organic acids of the group mentioned above may be substituted for oxalic acid, although most of them act more slowly than oxalic acid and some require heating to produce results. Of these other acids, malonic, tartaric and gallic acids deserve special mention.

Other agents having an oxidizing effect may be substituted for sodium nitrate.

Other soluble compounds of iron may be substituted for the ferrous sulphate, the sulphate being cited because of its commercial availability.

If inert material is added, any other material having the necessary qualities may be substituted for fuller's earth.

Apparently, in any case when a solution of a salt will react with zinc and iron, each separately, to produce a substantially insoluble salt on the surface of the metal, the action of the solution on zinc is greatly expedited by the presence of a soluble compound of iron, and the resulting coating is improved in quality and adherence. An article coated in this manner has a surface exceedingly well adapted to receive a finishing coat of paint, lacquer or enamel, and comprising apparently a substantially insoluble salt of zinc and a similar salt of iron. The above description explains how this discovery may be utilized with various solutions, and will be understood as illustrative rather than exhaustive, as the invention is capable of wide application within the terms of the appended claims, in which it will be understood that "surface of zinc" applies to the zinc coating on galvanized iron as well as to all other instances where a surface of zinc is presented.

What I claim is:

1. An article having a zinc surface covered by a coating formed in situ on said surface and comprising a substantially insoluble salt of zinc, said salt being of an acid of the group consisting of the dicarboxylic and hydroxydicarboxylic acids of the aliphatic series and the carboxylic acids having only one carboxyl group and the sulphonic acids of the aromatic series, and a similar salt of iron, said coat being of a kind and quantity adapted to hold paint on said surface.

2. A method of coating a metallic zinc surface which consists in subjecting said surface to the coating action of a coating material of the group consisting in solutions of the dicarboxylic and hydroxydicarboxylic acids of the aliphatic series and the carboxylic acids having only one carboxyl group and the sulphonic acids of the aromatic series, and accelerating the action of said coating material by employing in the solution a soluble salt of iron.

3. A method of coating a metallic zinc surface which consists in subjecting said surface to the coating action of a solution of oxalic acid, and expediting said coating action by employing in the solution a soluble salt of iron.

4. A mixture for forming a coating solution, said mixture comprising granular acid material of the group consisting in the dicarboxylic and hydroxydicarboxylic acids of the aliphatic series, and the carboxylic acids having only one carboxyl group and the sulphonic acids of the aromatic series, and containing also a compound of iron that is soluble in an aqueous solution of said acidic material.

5. The process of forming a coating solution comprising dissolving a compound of iron in water with oxalic acid and an oxidizing agent.

6. The process of forming a coating solution which consists in forming a mixture of oxalic acid and a ferrous salt and dissolving the mixture in an aqueous solution with an oxidizing agent.

7. A granular material for forming a coating solution and containing oxalic acid and a soluble compound of iron.

8. A granular material for forming a coating solution and containing oxalic acid and a ferrous salt.

9. A material comprising a mixture of oxalic acid, sodium nitrate and ferrous sulphate.

10. A material comprising a mixture of oxalic acid, sodium nitrate and ferrous sulphate in about the proportions of 6, 2 and 1, respectively.

11. An article having a zinc surface covered by a coating formed in situ on said surface and comprising a substantially insoluble oxalate of zinc and a similar salt of iron, said coat being of a kind and quantity adapted to hold paint on the surface.

MATTHEW GREEN.